United States Patent [19]

Degelman

[11] Patent Number: 5,484,192
[45] Date of Patent: Jan. 16, 1996

[54] MOUNTING OF AN AXLE SPINDLE OF AN AGRICULTURAL IMPLEMENT

[75] Inventor: Wilfred J. Degelman, Raymore, Canada

[73] Assignee: Degelman Industries Ltd., Regina, Canada

[21] Appl. No.: 263,237

[22] Filed: Jun. 21, 1994

[51] Int. Cl.⁶ .................................................. B60B 35/10
[52] U.S. Cl. ........................ 301/131; 301/128; 180/906; 172/383
[58] Field of Search .................................... 301/36.1, 36.2, 301/124.1, 126, 127, 128, 129, 131, 132; 280/64; 180/905, 906; 172/278, 286, 383, 384, 739

[56] References Cited

U.S. PATENT DOCUMENTS

| | | | |
|---|---|---|---|
| 246,598 | 9/1881 | Casaday | 172/383 X |
| 797,617 | 8/1905 | Sefton | 172/383 X |
| 829,605 | 8/1906 | Ridings | 172/384 X |
| 2,918,300 | 12/1959 | Hendrickson | 172/383 X |
| 3,765,466 | 10/1973 | Tsuruta | 280/64 X |

FOREIGN PATENT DOCUMENTS

| | | | |
|---|---|---|---|
| 449608 | 7/1936 | United Kingdom | 301/128 |

*Primary Examiner*—Russell D. Stormer
*Attorney, Agent, or Firm*—Anthony R. Lambert

[57] ABSTRACT

A mounting for an axle spindle of an agricultural implement is described which is adjustable between a substantially horizontal travel position and a downwardly inclined field working position. The downwardly inclined position is used in order to enhance performance of the agricultural implement, especially dual wing implements.

3 Claims, 2 Drawing Sheets

MOUNTING OF AN AXLE SPINDLE OF AN AGRICULTURAL IMPLEMENT

The present invention relates to a mounting for an axle spindle of an agricultural implement.

BACKGROUND OF THE INVENTION

An axle spindle is generally mounted in a substantially horizontal mounting position.

SUMMARY OF THE INVENTION

What is required is an alternative form of mounting for an axle spindle of an agricultural implement.

According to the present invention there is provided a mounting for an axle spindle of an agricultural implement, which includes a substantially horizontal travel position and a downwardly inclined field working position. Means is provided for moving the axle spindle between the travel position and the field working position. Means is provided for locking the axle spindle in one of the travel position and the field working position.

It is generally known that if an axle spindle is not mounted in a substantially horizontal mounting position that an inordinate amount of tire wear occurs. However, with agricultural implements it is sometimes desirable to mount an axle spindle in other than a horizontal position in order to achieve a specific objective related to the performance of the agricultural implement. Beneficial results have been obtained by the Applicant in inwardly inclining the lower portions of the wheels of agricultural implements having dual wings. It has been found that this wheel positioning assists in spreading the wings when the agricultural implement is reversed, thereby enabling a farmer to place the agricultural implement in a field working condition without having to dismount his tractor.

The preferred means of moving the axle spindle from the travel position to the field working position includes a sleeve is secured to a frame of the agricultural implement. The sleeve is downwardly inclined at an angle. The axle spindle has a frame end which is received in the sleeve and a wheel end on which a wheel is mounted. The frame end has a first axis and the wheel end has a second axis that is angularly offset from the first axis at substantially the same angle as the downward incline of the sleeve. The axle spindle is movable between the travel position and the field working position by rotating the frame end of the axle spindle relative to the sleeve thereby changing the orientation of the second axis. In the travel position the angle of inclination of the sleeve offsets the angular deviation between the first axis and the second axis of the axle spindle to position the wheel end of the axle spindle in a substantially horizontal position. In the field working position the angle of inclination of the sleeve creates a cumulative offset with the angular deviation between the first axis and the second axis of the axle spindle to position the wheel end of the axle spindle in an inclined position.

The preferred means for locking the axle spindle in a selected position includes aligned apertures in the sleeve, and a transverse passage through the axle spindle. The transverse passage only aligns with the apertures in the travel position and the field working position. The axle spindle is secured to the sleeve by means of a bolt in one of the travel position and the field working position.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
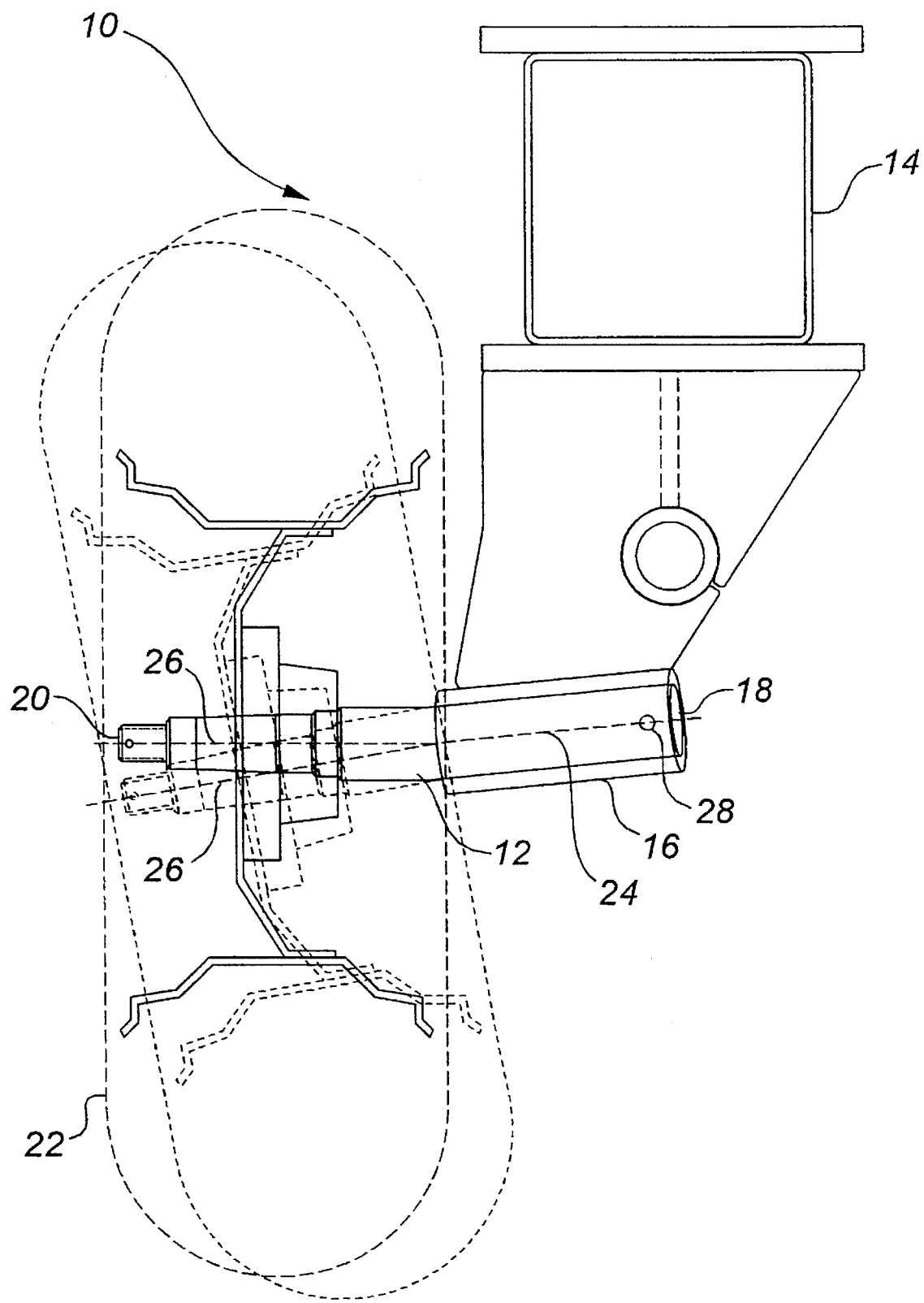
FIG. 1 is side elevation view of a mounting for an axle spindle constructed in accordance with the teachings of the invention.

The preferred embodiment, a mounting for an axle spindle of an agricultural implement generally identified by reference numeral 10, will now be described with reference to FIGS. 1 through 4.

Figure 2:
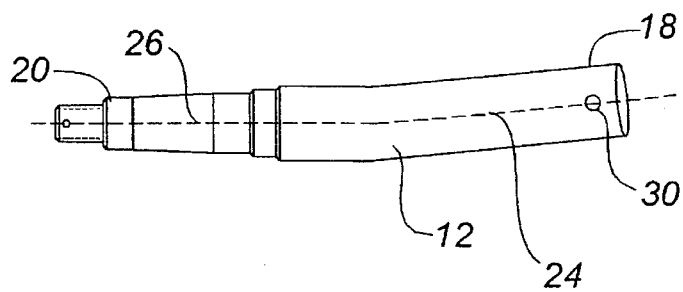
FIG. 2 is side elevation view of an axle spindle constructed in accordance with the teachings of the invention.
Figure 3:
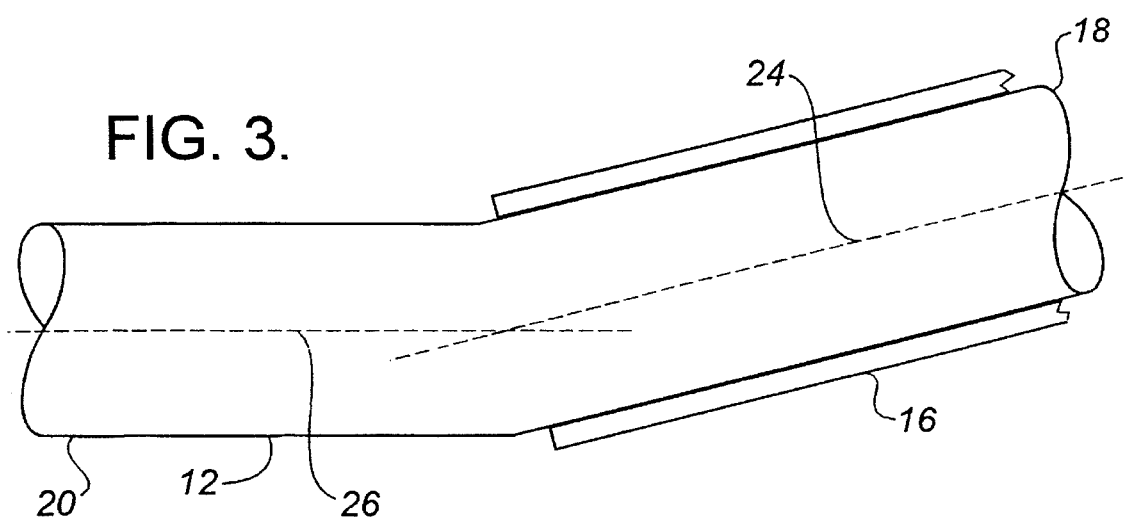
FIG. 3 is a diagrammatic representation of the axle spindle illustrated in FIG. 1 in the travel position.
Figure 4:
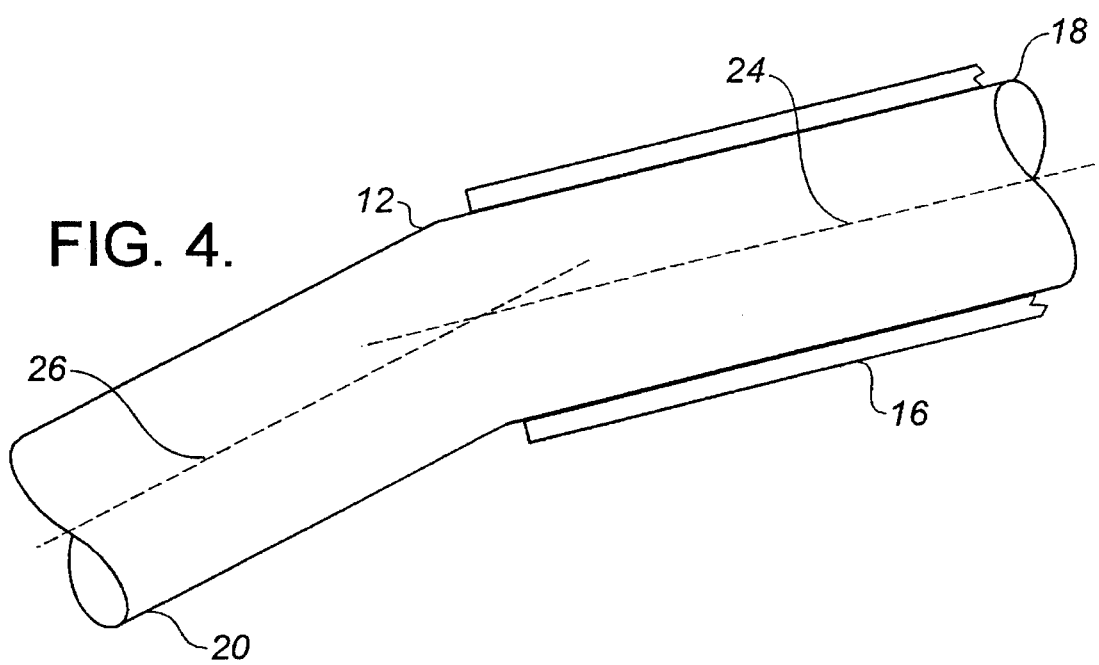
FIG. 4 is a diagrammatic representation of the axle spindle illustrated in FIG. 1 in the field working position.

Referring to FIG. 1, there is illustrated an axle spindle 12 and a frame 14 of an agricultural implement (not shown). Mounting 10 includes a sleeve 16 is secured to frame 14. Sleeve 16 is downwardly inclined at an angle, for reasons that will hereinafter be further explained. Axle spindle 12 has a frame end 18 and a wheel end 20. Axle end 18 is received sleeve 16. A wheel 22 (shown in ghost lines) is mounted on wheel end 20. Frame end 18 has a first axis 24. Wheel end 20 has a second axis 26 that is angularly offset from first axis 24 at substantially the same angle as the downward incline of sleeve 16. Axle spindle 12 is movable between a substantially horizontal travel position and a downwardly inclined field working position by rotating frame end 18 of axle spindle 12 relative to sleeve 16. This changes the orientation of second axis 26. Referring to FIG. 3, in the travel position the angle of inclination of sleeve 16 offsets the angular deviation between first axis 24 and second axis 26 to position wheel end 20 of axle spindle 12 in a substantially horizontal position. Referring to FIG. 4, in the field working position the angle of inclination of sleeve 16 creates a cumulative offset with the angular deviation between first axis 24 and second axis 26 to position wheel end 20 of axle spindle 12 in an inclined position. It should be noted that FIGS. 3 and 4 have been exaggerated in order to demonstrate the underlying principle. Referring to FIG. 1, sleeve 16 has apertures 28 that are aligned such that a bolt (not shown) can be extended therethrough. Referring to FIG. 2, axle spindle 12, in turn, has a transverse passage 30. Axle spindle 12 is fabricated such that transverse passage 30 only aligns with apertures 28 when positioned in the travel position or the field working position. Once positioned in one of the travel position and the field working position, axle spindle is secured to sleeve 16 by means of a bolt (not shown) that extends through both apertures 28 and transverse passage 30.

It will be apparent to one skilled in the art that modifications may be made to the illustrated embodiment without departing from the spirit and scope of the invention as hereinafter defined in the claims.

The embodiments of the invention in which an exclusive property or privilege is claimed are defined as follows:

1. A mounting for an axle spindle of an agricultural implement, comprising:

a sleeve is secured to a frame of the agricultural implement;

the axle spindle has a frame end which is received in the sleeve and a wheel end on which a wheel is mounted, the axle spindle is bent and by rotating the frame end of the axle spindle relative to the sleeve the wheel end of the axle spindle is movable between a substantially horizontal travel position and a downwardly inclined field working position; and means for locking the axle spindle in one of the travel position and the field working position including a aligned apertures in the sleeve, and a transverse passage through the axle spindle, the transverse passage only aligning with the apertures in the travel position and the field working position whereby the axle spindle is secured to the sleeve by means of a bolt in one of the travel position and the field working position.

2. A mounting for an axle spindle of an agricultural implement, comprising:

a sleeve is secured to a frame of the agricultural implement, the sleeve being downwardly inclined at an angle;

the axle spindle having a frame end which is received in the sleeve and a wheel end on which a wheel is mounted, the frame end having a first axis and the wheel end having a second axis that is angularly offset from the first axis at substantially the same angle as the downward incline of the sleeve, such that the axle spindle is movable between a substantially horizontal travel position and a downwardly inclined field working position by rotating the frame end of the axle spindle relative to the sleeve thereby changing the orientation of the second axis, in the travel position the angle of inclination of the sleeve offsetting the angular deviation between the first axis and the second axis of the axle spindle to position the wheel end of the axle spindle in a substantially horizontal position, in the field working position the angle of inclination of the sleeve creating a cumulative offset with the angular deviation between the first axis and the second axis of the axle spindle to position the wheel end of the axle spindle in an inclined position; and means for locking the axle spindle to the sleeve in the travel position and the field working position.

3. A mounting for an axle spindle of an agricultural implement, comprising:

a sleeve is secured to a frame of the agricultural implement, the sleeve being downwardly inclined at an angle;

the axle spindle having a frame end which is received in the sleeve and a wheel end on which a wheel is mounted, the frame end having a first axis and the wheel end having a second axis that is angularly offset from the first axis at substantially the same angle as the downward incline of the sleeve, such that the axle spindle is movable between a substantially horizontal travel position and a downwardly inclined field working position by rotating the frame end of the axle spindle relative to the sleeve thereby changing the orientation of the second axis, in the travel position the angle of inclination of the sleeve offsetting the angular deviation between the first axis and the second axis of the axle spindle to position the wheel end of the axle spindle in a substantially horizontal position, in the field working position the angle of inclination of the sleeve creating a cumulative offset with the angular deviation between the first axis and the second axis of the axle spindle to position the wheel end of the axle spindle in an inclined position; and aligned apertures in the sleeve, and a transverse passage through the axle spindle, the transverse passage only aligning with the apertures in the travel position and the field working position whereby the axle spindle is secured to the sleeve by means of a bolt in one of the travel position and the field working position.

* * * * *